US012804035B2

(12) United States Patent
Kikuta et al.

(10) Patent No.: US 12,804,035 B2
(45) Date of Patent: Nov. 17, 2026

(54) COMMUNICATION SYSTEM, COMMUNICATION DEVICE, AND COMMUNICATION INTERFACE

(71) Applicant: LAPIS Technology Co., Ltd., Yokohama (JP)

(72) Inventors: Hiroyuki Kikuta, Yokohama (JP); Takayoshi Fujino, Yokohama (JP); Ryo Matsumoto, Yokohama (JP); Masato Yamazaki, Yokohama (JP)

(73) Assignee: LAPIS Technology Co., Ltd., Yokohama (JP)

( * ) Notice: Subject to any disclaimer, the term of this patent is extended or adjusted under 35 U.S.C. 154(b) by 211 days.

(21) Appl. No.: 18/789,163

(22) Filed: Jul. 30, 2024

(65) Prior Publication Data

US 2025/0047741 A1 Feb. 6, 2025

(30) Foreign Application Priority Data

Jul. 31, 2023 (JP) ................................ 2023-124697

(51) Int. Cl.
*H04L 67/1061* (2022.01)
*H04L 69/22* (2022.01)

(52) U.S. Cl.
CPC .......... *H04L 67/1068* (2013.01); *H04L 69/22* (2013.01)

(58) Field of Classification Search
CPC ..... H04L 67/1068; H04L 69/22; H04L 12/40; H04L 12/40006; H04L 2012/40215
See application file for complete search history.

(56) References Cited

U.S. PATENT DOCUMENTS

| | | | | |
|---|---|---|---|---|
| 2015/0102943 | A1 | 4/2015 | de Greef et al. | |
| 2015/0104673 | A1 | 4/2015 | de Greef et al. | |
| 2015/0365338 | A1* | 12/2015 | Pannell | H04J 3/0697 370/412 |
| 2019/0303268 | A1* | 10/2019 | Ansari | G06F 11/267 |
| 2022/0216038 | A1* | 7/2022 | Wu | H01J 37/32146 |
| 2022/0345417 | A1* | 10/2022 | Kasichainula | H04L 47/30 |

FOREIGN PATENT DOCUMENTS

| | | |
|---|---|---|
| JP | 2015-076890 A | 4/2015 |

* cited by examiner

*Primary Examiner* — Azizul Choudhury
(74) *Attorney, Agent, or Firm* — Rabin & Berdo. P.C

(57) ABSTRACT

On receipt of a first frame, each of a plurality of communication devices transfers the first frame through a second port in a case in which it has recognized itself as not being a first communication device based on first information, and does not transfer the first frame in a case in which it has recognized itself as being the first communication device. On receipt of a second frame, each of the plurality of communication devices transfers the second frame through the first port in a case in which it has recognized itself as not being a second communication device based on second information, and does not transfer the second frame in a case in which it has recognized itself as being the second communication device.

11 Claims, 9 Drawing Sheets

COMMUNICATION SYSTEM, COMMUNICATION DEVICE, AND COMMUNICATION INTERFACE

CROSS-REFERENCE TO RELATED APPLICATION

This application is based on and claims the benefit of priority of the prior Japanese Patent Application No. 2023-124697, filed on Jul. 31, 2023, the entire contents of which are incorporated herein by reference.

BACKGROUND

Technical Field

The present disclosure relates to an communication system, a communication device, and a communication interface.

Related Art

Technology related to state monitoring of cells has hitherto employed a daisy chain connected communication format in which plural cell units are coupled together in series.

For example, there is technology related to a daisy chain communication bus and protocol (see Patent Document 1). In this technology, a communication circuit conveys cell state data in one direction of a two-way data path, via a first connection node, as far as a circuit on a first side. In response to display that the two-way data path is faulty, conveyance is performed along the other direction of the two-way data path, via a second connection node, as far as a circuit on a second side.

Patent Document 1: Japanese Patent Application Laid-Open (JP-A) No. 2015-076890

In technology hitherto, an example of a battery management system is disclosed in which plurality of communication circuits installed to battery cells are connected together in a daisy chain with two-way communication enabled, managed by a battery manager. Normally the battery manager performs communication from one direction, and in a case in which an abnormality such as a broken line or the like between any of the cells has occurred, battery cell management is able to be performed during the abnormality by performing communication from the opposite direction.

In the technology hitherto, switching is performed between performing communication using a path on one side, and communication using a path in a separate direction during a communication failure. Although technology hitherto is able to utilize paths in both directions, there is no consideration given to specific communication control for cases in which paths in both directions are employed, and frame collision might occur.

SUMMARY

A communication system of the present disclosure includes a communication device group that is configured by a plurality of communication devices each including a first port and a second port, and that is connected together in a daisy chain such that the first port and the second port are connected between adjacent communication devices, and a communication interface that connects the communication device group to a network. On receipt, over the network, of a first frame inserted with first information enabling recognition of a first communication device that limits frame transfer and of a second frame inserted with second information enabling recognition of a second communication device that limits frame transfer, the communication interface transmits the first frame to a first port of a communication device configuring a one-end of the daisy chain connection and transmits the second frame to a second port of a communication device configuring an other-end of the daisy chain connection. On receipt of the first frame, each of the plurality of communication devices transfers the first frame through the second port in a case in which it has recognized itself as not being the first communication device based on the first information, and does not transfer the first frame in a case in which it has recognized itself as being the first communication device, and on receipt of the second frame, each of the plurality of communication devices transfers the second frame through the first port in a case in which it has recognized itself as not being the second communication device based on the second information, and does not transfer the second frame in a case in which it has recognized itself as being the second communication device.

A communication device of the present disclosure is a communication device configuring a communication device group configured by a plurality of communication devices each including a first port and a second port, and connected together in a daisy chain such that the first port and the second port are connected between adjacent communication devices. On receipt of a first frame inserted with first information enabling recognition of a first communication device that limits frame transfer, the communication device transfers the first frame through the second port in a case in which it has recognized itself as not being the first communication device based on the first information, and the communication device does not transfer the first frame in a case in which it has recognized itself as being the first communication device. On receipt of a second frame inserted with second information enabling recognition of a second communication device that limits frame transfer, the communication device transfers the second frame through the first port in a case in which it has recognized itself as not being the second communication device based on the second information, and the communication device does not transfer the second frame in a case in which it has recognized itself as being the second communication device.

A communication device of the present disclosure is a communication device configuring a communication device group configured by a plurality of communication devices each including a first port and a second port, and connected together in a daisy chain such that the first port and the second port are connected between adjacent communication devices. Based on a frame received through either the first port or the second port and including designation information indicating a designated communication device, the communication device does not transfer the frame in a case in which it has recognized itself as being the designated communication device.

A communication interface of the present disclosure is a communication interface connecting a network to a communication device group configured by a plurality of communication devices each including a first port and a second port, and connected together in a daisy chain such that the first port and the second port are connected between adjacent communication devices. On receipt, over the network, of a first frame inserted with first information enabling recognition of a first communication device that limits frame transfer and of a second frame inserted with second information enabling recognition of a second communication device that limits frame transfer, the communication interface transmits the first frame to a first port of a communication device configuring a one-end of the daisy chain connection and transmits the second frame to a second port of a communication device configuring an other-end of the daisy chain connection.

DESCRIPTION OF EMBODIMENTS

Figure 1:
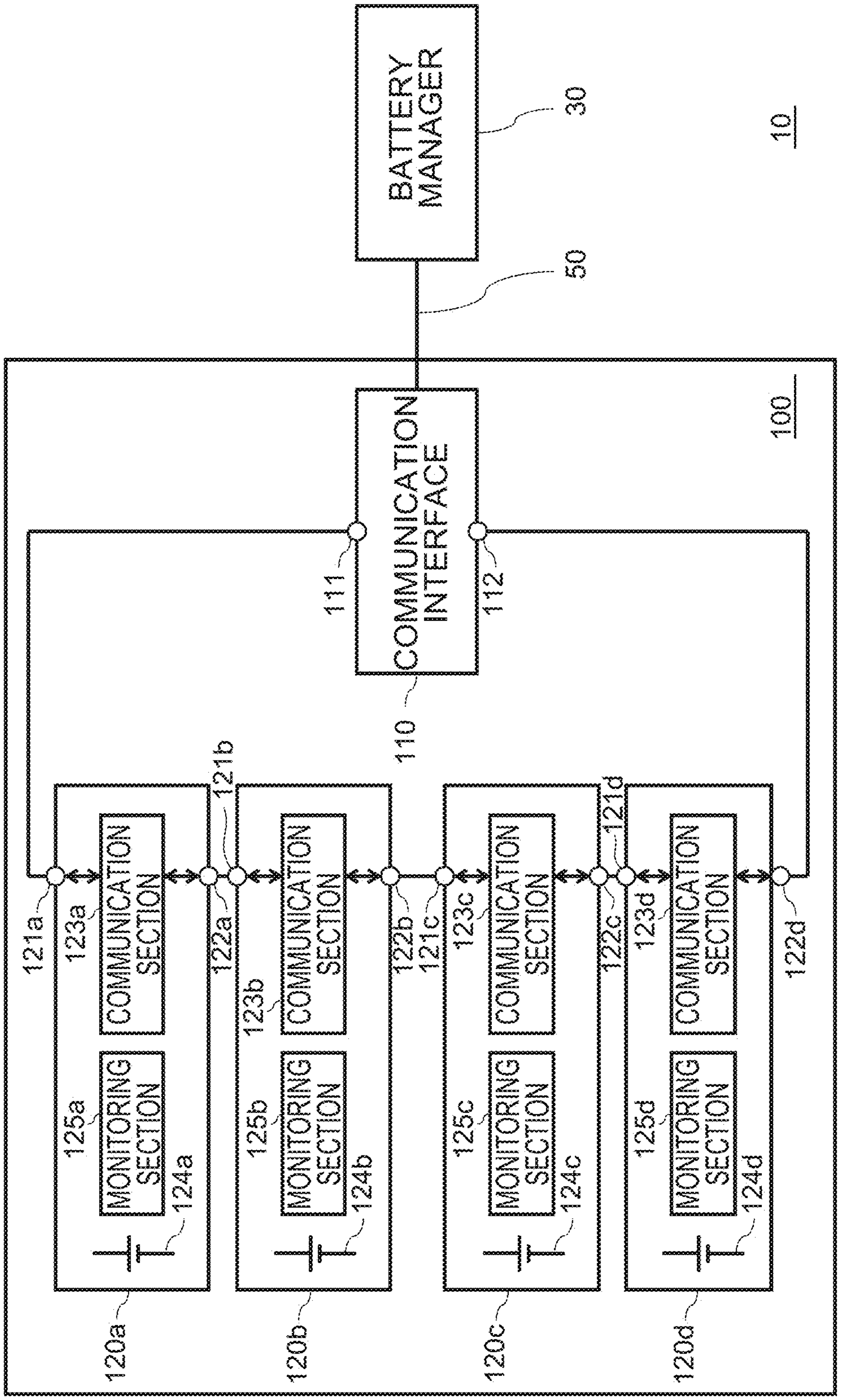
FIG. 1 is a diagram illustrating an example of a schematic configuration of a battery management system 10 according to an exemplary embodiment.

An object of the technology disclosed herein is accordingly to provide a communication system, a communication device, and a communication interface that enable frame collision to be avoided in communication employing paths in both directions of a daisy chain connection.

The technology disclosed herein exhibits the advantageous effect of enabling frame collision to be avoided in communication employing paths in both directions in a daisy chain connection.

Description follows regarding an example of exemplary embodiments of the present disclosure, with reference to the drawings. Note that the same reference numerals will be appended in the drawings to the same or equivalent configuration elements and parts. Moreover, dimensions and proportions in the drawings are exaggerated for ease of explanation, and sometimes differ from actual proportions.

Moreover, from now on when a term "connected" is be employed this term means electrically connected, and a wide definition should be interpreted therefor, including not just directly connected, by also including indirectly connected (for example, connected through a passive component).

FIG. 1 is a diagram illustrating an example of a schematic configuration of a battery management system 10 according to the present exemplary embodiment. The battery management system 10 includes a battery manager 30, a network 50, and a communication system 100.

The battery manager 30 requests and collects monitoring data, and executes various control based on the monitoring data.

The network 50 connects between the battery manager 30 and the communication system 100. As an example, the network 50 may be a controller area network (CAN) bus.

The communication system 100 is connected to the battery manager 30 over the network 50 so as to be able to communicate therewith. The communication system 100 includes a communication interface 110, and a communication device group configured from plurality of communication devices 120*a*, 120*b*, 120*c*, and 120*d* (collectively called "communication devices 120").

The communication interface 110 connects the communication device group to the network 50, and conveys communication between the battery manager 30 and the communication device group. Although description will be given of an example of a case in which the communication interface 110 is implemented by a dedicated circuit, there is no limitation thereto. The communication interface 110 may be implemented by a computer including a processor. Moreover, a program that causes a computer to function as the communication interface 110 by being executed on a processor may be provided. Moreover, a non-transitory recording medium recorded with such a program may be provided. The communication interface 110 includes a first connection port 111 and a second connection port 112.

The communication devices 120 transmit monitoring data according to requests from the battery manager 30. Although description will be given of an example of a case in which the communication devices 120 are implemented by an integrated circuit, there is no limitation thereto. The communication devices 120 may be implemented by a computer including a processor. Moreover, a program that causes a computer to function as the communication devices 120 by being executed on a processor may be provided. Moreover, a non-transitory recording medium recorded with such a program may be provided.

The communication device 120*a* includes a first port 121*a*, a second port 122*a*, a communication section 123*a*, a battery cell 124*a*, and a monitoring section 125*a*. The first port 121*a* and the second port 122*a* are ports for communication with other devices, and the communication section 123*a* communicates with other devices through at least one out of the first port 121*a* or the second port 122*a*. The battery cell 124*a* may, as an example, be a cell of a lithium battery. However, there is no limitation thereto, and the battery cell 124*a* may be any energy storage cell such as an electric double-layer capacitor or the like. The monitoring section 125*a* monitors various states of the battery cell 124*a*, such as current, voltage, temperature, or the like.

In such a communication device 120*a*, monitoring data indicating states of the battery cell 124*a* is transmitted in response to requests from the battery manager 30. The configurations of the communication devices 120*b*, 120*c*, and 120*d* may be the same as in the communication device 120*a*, and so detailed explanation thereof will be omitted.

The plurality of communication devices 120 each include the first port 121 and the second port 122, with the plurality of communication devices 120 configured as a communication device group by daisy chain connection such that the first port 121 and the second port 122 are connected between adjacent devices.

Namely, a daisy chain is formed by connecting the second port 122*a* of the communication device 120*a* to the first port 121*b* of the communication device 120*b*, connecting the second port 122*b* of the communication device 120*b* to the first port 121*c* of the communication device 120*c*, and connecting the second port 122*c* of the communication device 120*c* to the first port 121*d* of the communication device 120*d*.

The first connection port 111 of the communication interface 110 is connected to the first port 121*a* of the communication device 120*a* configuring a one-end (the upper end in the drawing) of the daisy chain connection, and the second connection port 112 of the communication interface 110 is connected to the second port 122*d* of the communication device 120*d* configuring an other-end (the lower end in the drawing) of the daisy chain connection.

Note that in the drawing, for ease of explanation, an example is illustrated in which there are four communication devices 120*a* to *d* connected in a daisy chain, however similar applies when the number of communication devices 120 is any number of two or more.

Figure 2:
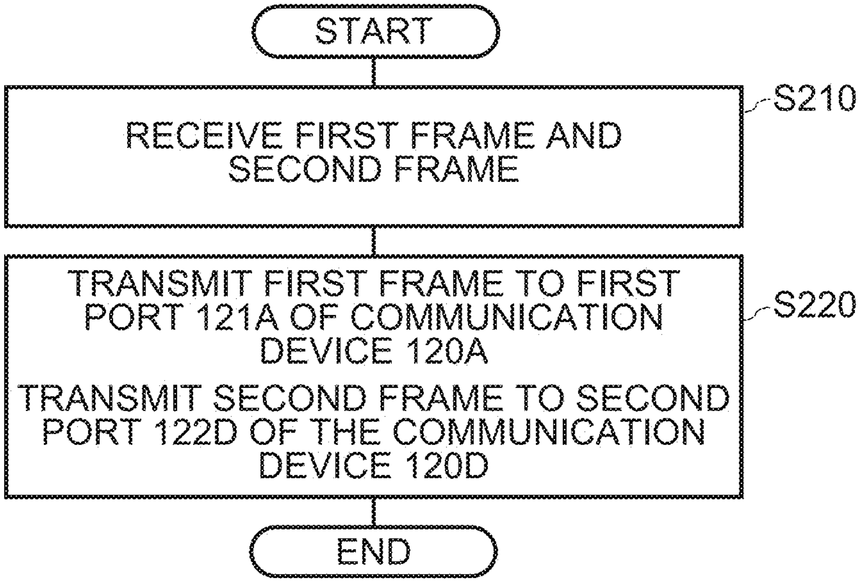
FIG. 2 is a diagram illustrating an example of frame processing executed by a communication interface 110 according to the present exemplary embodiment.

FIG. 2 is a diagram illustrating an example of frame processing executed by the communication interface 110 according to the present exemplary embodiment. At step S210, the communication interface 110 receives a first frame and a second frame from the battery manager 30 over the network 50. Such first and second frames may include a command from the battery manager 30 requesting monitoring data.

In the first frame, first information enabling recognition of a first communication device that limits frame transfer is inserted into the first field. In the second frame, second information enabling recognition of a second communication device that limits frame transfer is inserted into the first field. The first information and the second information may be inserted by the battery manager. Description follows regarding an example of a case in which the first communication device is the communication device 120*b*, and the second communication device is the communication device 120*c*. Adopting such a configuration in which the communication devices 120*b* and 120*c* arranged at the center of the daisy chain connection are the first communication device and the second communication device enables communication to be used evenly in both directions, and so is preferable. However, there is no limitation thereto, and two communication devices 120 arranged at positions shifted toward the one-end or the other-end in the daisy chain connection may be employed as the first communication device and the second communication device. Such cases are particularly effective when the communication speeds are different in each of the two directions of the daisy chain connection, or the like.

In the first exemplary embodiment, identifiers allocated to the communication devices 120 are employed to limit frame transfer. An identifier that uniquely identifies is allocated to each of the communication devices 120. Such identifiers may be pre-allocated, or may be retrospectively allocated at the time of first communication.

In the first exemplary embodiment, the first information indicates the first identifier allocated to the first communication device, and the second information indicates the second identifier allocated to the second communication device. Namely, "120*b*" may be inserted in a first field of the first frame as the identifier of the first communication device. Similarly, "120*c*" may be inserted in a first field of the second frame as the identifier of the second communication device.

At step S220, the communication interface 110 transmits the first frame to the communication device group through the first connection port 111, and transmits the second frame to the communication device group through the second connection port 112. The communication interface 110 thereby transmits the first frame to the first port 121*a* of the communication device 120*a* configuring the daisy chain connection one-end, and transmits the second frame to the second port 122*d* of the communication device 120*d* configuring the daisy chain connection other-end.

The communication interface 110 may, for example in this manner, transmit the two frames having different information inserted into the first field to both ends of the daisy chain connection at the same time. Doing so enables communication speed of the communication system 100 as a whole to be doubled compared to cases in which only one direction of a daisy chain connection is employed. Note that when doing so, the communication interface 110 can decide which of the two frames is the first frame and which is the second frame based on connection relationships of the communication devices 120 in the daisy chain connection. As an example, the communication device 120*b* is the second device counting from the daisy chain connection one-end, and the third device counting from the other-end, enabling transfer with a smaller number of transfers from the one-end than from the other-end. In such cases, the communication interface 110 is may decide the frame inserted with "120*b*" in the first field is the first frame. Similarly, the communication device 120*c* is the third device counting from the daisy chain connection one-end and the second device from the other-end, enabling transfer with a smaller number of transfers from the other-end than from the one end. In such cases, the communication interface 110 may decide the frame inserted with "120*c*" in the first field is the second frame.

Figure 3:
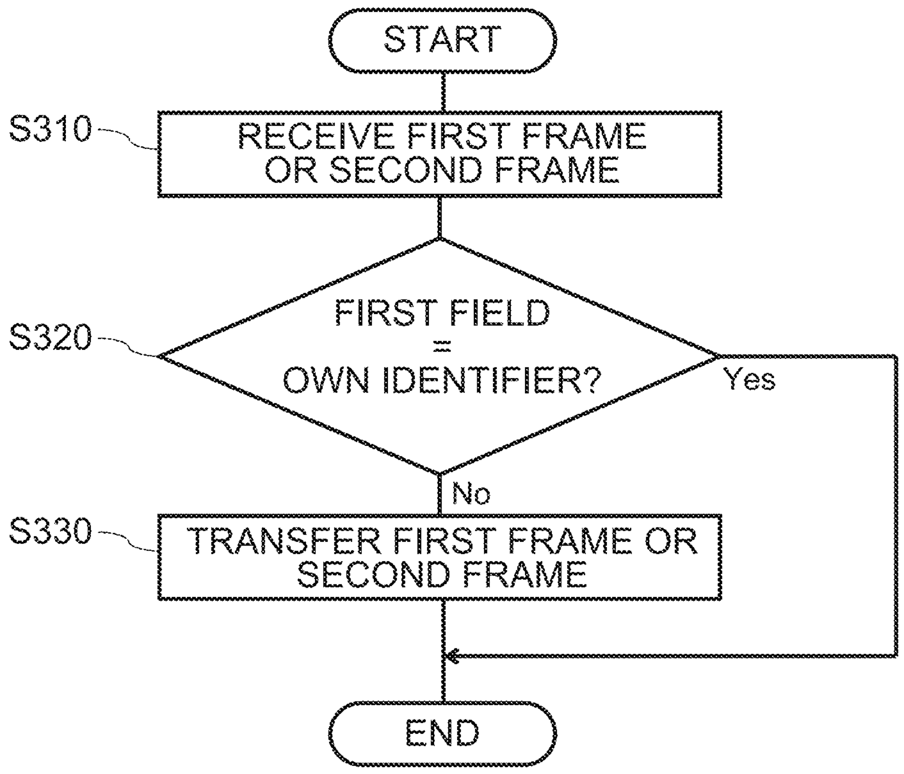
FIG. 3 is a diagram illustrating an example of frame processing executed by a communication device 120 according to a first exemplary embodiment.

FIG. 3 is a diagram illustrating an example of frame processing executed by each of the communication devices 120 according to the first exemplary embodiment. At step S310, the communication device 120 receives the first frame or the second frame. At step S320, the communication device 120 determines whether or not a first field matches its own identifier. In cases in which the first field does not match its own identifier, the communication device 120 proceeds to the processing of step S330, and transfers the first frame or the second frame. However, the communication device 120 does not execute the processing of step S330 in a case in which the first field does match its own identifier. Namely, the communication device 120 does not transfer the first frame or the second frame. Detailed explanation follows regarding such frame transfer according to the first exemplary embodiment, with reference to the drawings.

Figure 4:
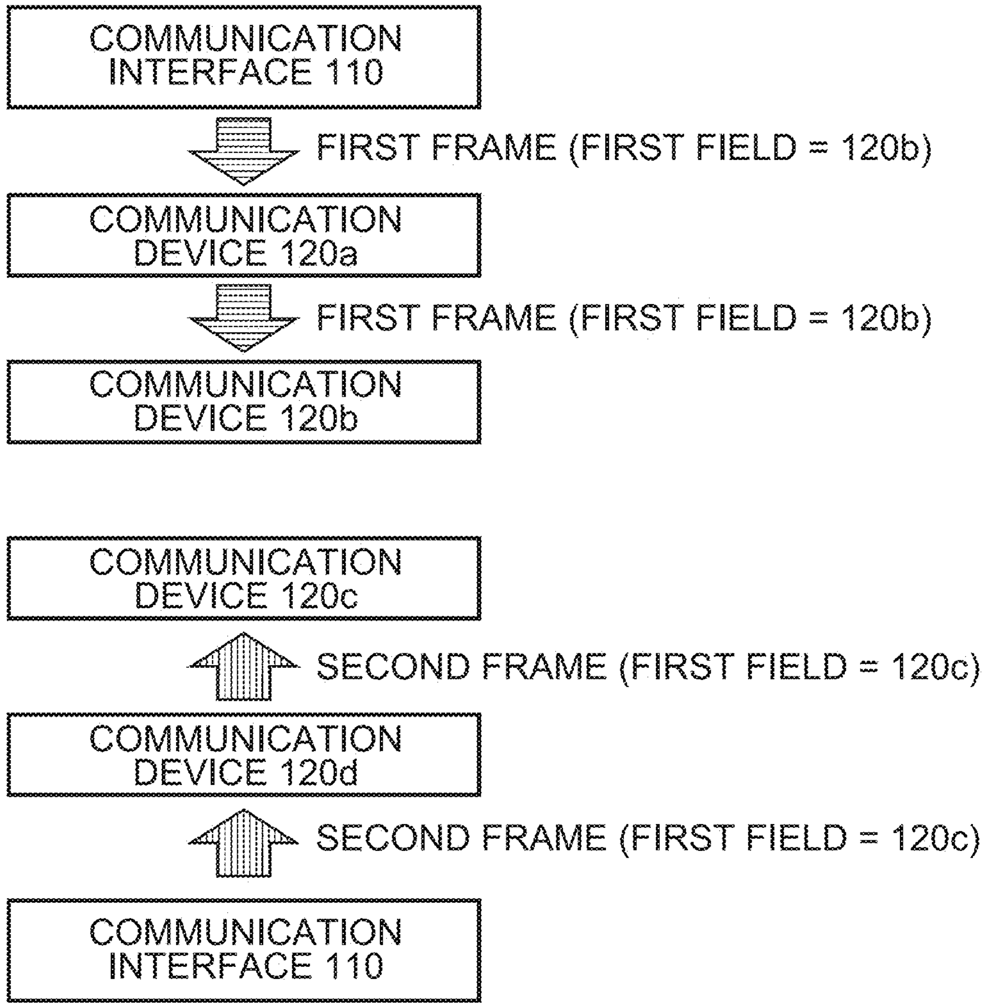
FIG. 4 is a diagram illustrating an example of frame transfer according to the first exemplary embodiment.

FIG. 4 is a diagram illustrating an example of frame transfer according to the first exemplary embodiment. On receipt of the first frame set with the first field=120*b*, and the second frame set with the first field=120*c*, the communication interface 110 transmits the first frame to the first port 121*a* of the communication device 120*a*, and transmits the second frame to the second port 122*d* of the communication device 120*d*.

In response thereto, the communication device 120*a* receives the first frame and determines whether or not the first field matches its own identifier. In this case the first field≠120*a* and the first field does not match its own identifier, and so the communication device 120*a* recognizes itself as not being the first communication device. In such cases, the communication device 120*a* transfers the first frame to the communication device 120*b* through the second port 122*a*. Namely, the communication device 120*a* transfers the first frame through the second port 122*a* in a case in which the first frame has been received and the communication device 120*a* has recognized itself as not being the first communication device based on the first information.

Similarly, on receipt of the second frame, the communication device 120*d* determines whether or not the first field matches its own identifier. In this case the first field≠120*d*, and the first field does not match its own identifier, and so the communication device 120*d* recognizes itself as not being the second communication device. In such cases, the communication device 120*d* transfers the second frame to the communication device 120*c* through the first port 121*d*. Namely, the communication device 120*d* transfers the second frame through the first port 121*d* in a case in which the second frame has been received and the communication device 120*d* has recognized itself as not being the second communication device based on the second information.

Next, on receipt of the first frame, the communication device 120*b* determines whether or not the first field matches its own identifier. In this case the first field=120*b* and the first field matches its own identifier, and so the communication device 120*b* recognizes itself as being the first communication device. Namely, the communication device 120*b* recognizes itself to be the first communication device in a case in which the first identifier matches its own identifier. In this case the communication device 120*b* does not transfer the first frame. Namely, the communication device 120*b* does not transfer the first frame in a case in which the first frame has been received and it has recognized itself not to be the first communication device based on the first information.

Similarly, on receipt of the second frame, the communication device 120*c* determines whether or not the first field matches its own identifier. In this case first field=120*c* and the first field matches its own identifier, and so the communication device 120*c* recognizes itself to be the second communication device. Namely, the communication device 120*c* recognizes itself to be the second communication device when the second identifier matches its own identifier. In such cases the communication device 120*c* does not transfer the second frame. Namely, the communication device 120*c* does not transfer the second frame in a case in which the second frame has been received and it has recognized itself as being the second communication device based on the second information.

In this manner, each of the communication devices 120 does not transfer frames in a case in which it has recognized itself as being a designated communication device based on a frame that was received through one or other out of the first port 121 or the second port 122 and that includes designation information indicating the designated communication device. This means that in the communication system 100 according to the present exemplary embodiment, transfer of the first frame from the daisy chain connection one-end is limited to as far as the communication device 120*b*, and transfer of the second frame from the daisy chain connection other-end is limited to as far as the communication device 120*c*. Thereby, the communication system 100 according to the present exemplary embodiment is able to avoid frame collision even in a case in which two frames are transferred using paths in both directions of the daisy chain connection.

Frame transfer has been described, namely requests from the battery manager 30 for monitoring data, however the communication system 100 according to the present exemplary embodiment is able to provide monitoring data to the battery manager 30 in response to such requests.

Figure 5:
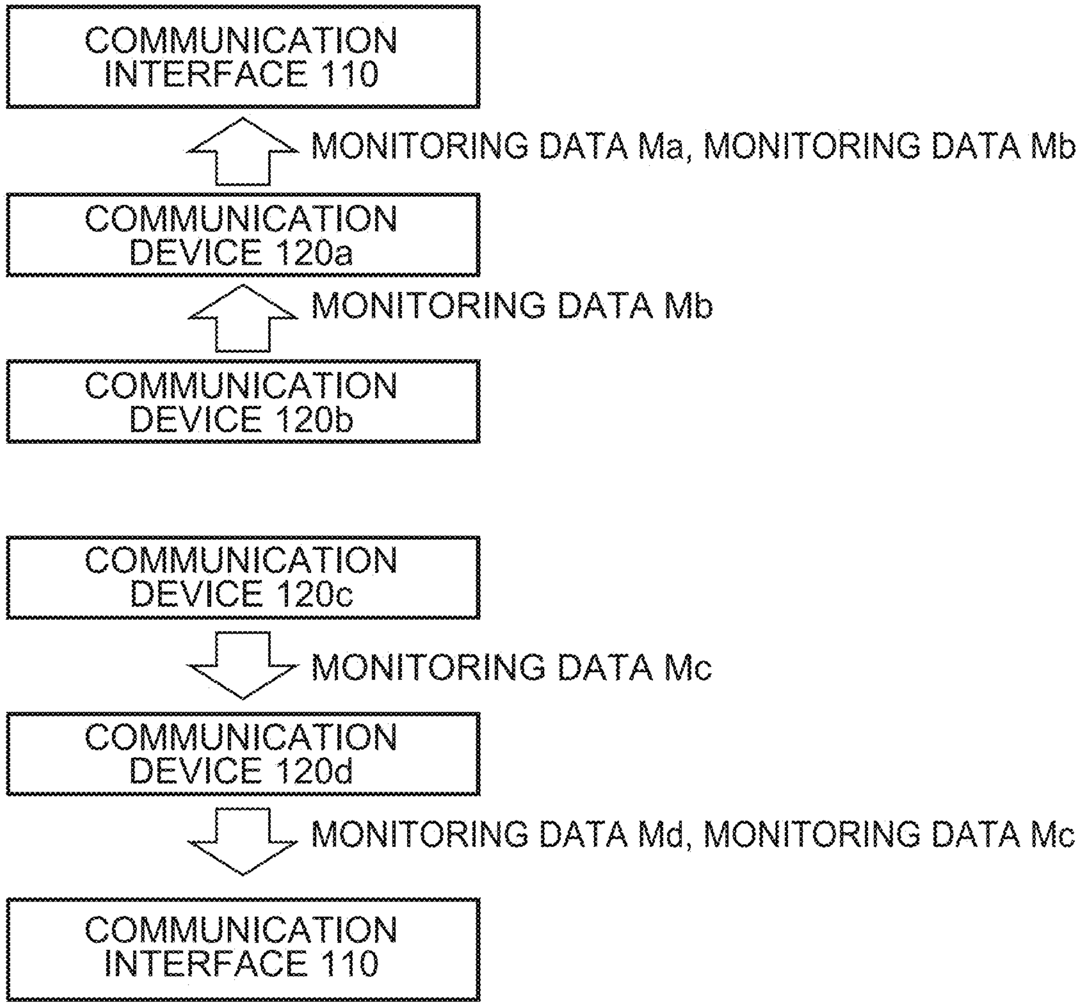
FIG. 5 is a diagram illustrating an example of data transfer in response to frame transfer according to the present exemplary embodiment.

FIG. 5 is a diagram illustrating an example of data transfer in response to frame transfer according to the present exemplary embodiment. On receipt of the first frame through the first port 121*a*, the communication device 120*a* transmits monitoring data Ma indicating a state of the battery cell 124*a* through the first port 121*a*. The communication interface 110 thereby receives the monitoring data Ma through the first connection port 111.

On receipt of the first frame through the first port 121*b*, the communication device 120*b* transmits monitoring data Mb indicating a state of the battery cell 124*b* through the first port 121*b*. Next, on receipt of the monitoring data Mb through the second port 122*a*, the communication device 120*a* transfers the monitoring data Mb through the first port 121*a*. The communication interface 110 thereby receives the monitoring data Mb through the first connection port 111.

Similarly, on receipt of the second frame through the second port 122*d*, the communication device 120*d* transmits monitoring data Md indicating a state of the battery cell 124*d* through the second port 122*d*. The communication interface 110 thereby receives the monitoring data Md through the second connection port 112.

On receipt of the second frame through the second port 122*c*, the communication device 120*c* transmits monitoring data Mc indicating a state of the battery cell 124*c* through the second port 122*c*. Next, on receipt of the monitoring data Mc through the first port 121*d*, the communication device 120*d* transfers the monitoring data Mc through the second port 122*d*. By doing so, the communication interface 110 receives the monitoring data Mc through the second connection port 112.

Then on receipt of the monitoring data Ma, Mb, Mc, and Md, the communication interface 110 provides the monitoring data Ma, Mb, Mc, and Md to the battery manager 30, which is the transmission originator of the first frame and the second frame, over the network 50. When doing so, the communication interface 110 may provide the monitoring data Ma, Mb, Mc, and Md to the battery manager 30 collected together, or may provide the monitoring data Ma, Mb, Mc, and Md to the battery manager 30 individually.

Thus in the communication system 100 according to the present exemplary embodiment, in response to frame transfer, monitoring data is provided to the transmission originator of the first frame and the second frame. When doing so, in the communication system 100 according to the present exemplary embodiment, a communication device 120 that has received a frame through the first port 121 transmits monitoring data through the first port 121, and a communication device 120 that has received a frame through the second port 122 transmit the monitoring data through the second port 122, thereby enabling a collision of monitoring data to be avoided even in a case in which monitoring data is transferred using paths in both directions of the daisy chain connection.

Note that various modifications may be implemented to the above exemplary embodiment and application thereof may be made to various applications. For example, in the above description an example has been illustrated of a case in which frame transfer is limited by using identifiers appended to the communication devices 120. However, limiting frame transfer may be achieved by limiting the number of transfers. Detailed description follows thereof.

Figure 6:
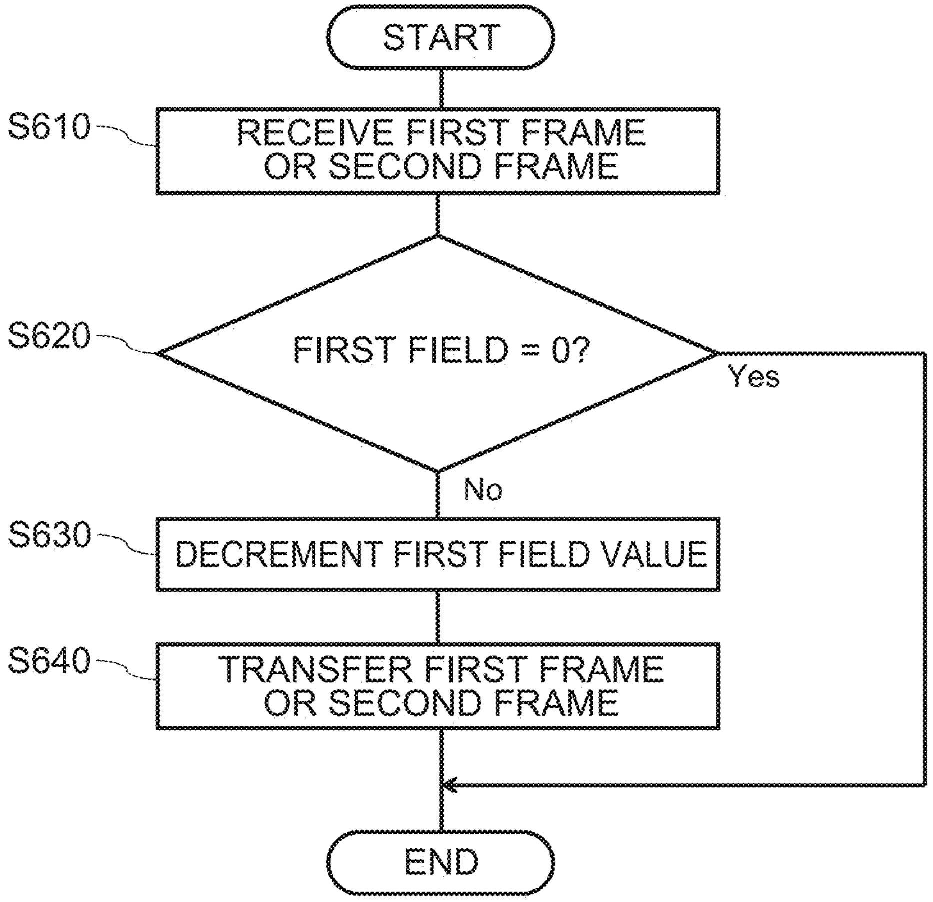
FIG. 6 is a diagram illustrating an example of frame processing executed by a communication device 120 according to a second exemplary embodiment.

FIG. 6 is a diagram illustrating an example of frame processing executed by a communication device 120 according to a second exemplary embodiment. At step S610, the communication device 120 receives a first frame or a second frame. In the second exemplary embodiment, in the first frame, a first number of times indicating a possible number of times remaining to transfer the first frame is inserted into a first field. In the second frame, a second number of times indicating a possible number of times remaining to transfer the second frame is inserted into a first field. Description follows regarding an example of a case in which the first number of times and the second number of times are both 1 time. Thus using a number resulting from dividing the number of the plurality of communication devices 120 configuring the communication device group by two and subtracting 1 as both the first number of times and the second number of times enables even use of communication in both directions and so is preferable. However, there is no limitation thereto, and different numbers may be used for the first number of times and the second number of times within a range of numbers as long as the sum of first number of times and the second number of times is the number resulting from subtracting 2 from the number of plurality of communication devices 120 configuring the communication device group.

At step S620, the communication device 120 determines whether or not the first field is 0. Namely, the communication device 120 determines whether or not the possible number of times remaining to transfer frames is 0. In cases in which the first field is not 0, processing proceeds to step S630 and the communication device 120 decrements the value of the first field, and at step S640 transfers the first frame or the second frame. However, in a case in which the first field is 0, the communication device 120 does not execute the processing of step S630 to step S640. Namely, the communication device 120 does not transfer the first frame or the second frame. Detailed description follows regarding the frame transfer according to the second exemplary embodiment, with reference to the drawings.

Figure 7:
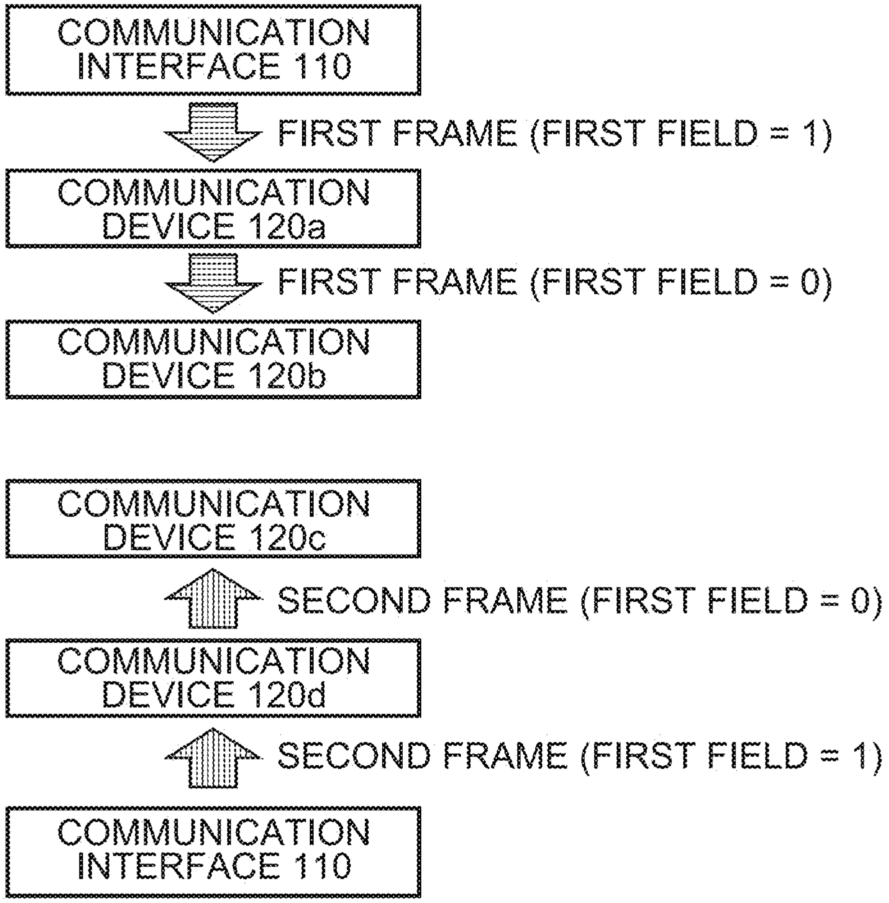
FIG. 7 is a diagram illustrating an example of frame transfer according to the second exemplary embodiment.

FIG. 7 is a diagram illustrating an example of a frame transfer according to the second exemplary embodiment. On receipt of the first frame set with first field=1 and the second frame set with first field=1, the communication interface 110 transmits the first frame to the first port 121*a* of the communication device 120*a*, and transmits the second frame to the second port 122*d* of the communication device 120*d*.

In response thereto, on receipt of the first frame the communication device 120*a* determines whether or not the first field is 0. In this case the first field≠0 and so there is a possible number of times remaining to transfer frames, and so the communication device 120*a* recognizes itself as not being the first communication device. In such cases, the communication device 120*a* decrements the first field value by 1 to 0, and transfers the first frame through the second port 122*a* to the communication device 120*b*. Namely, the communication device 120*a* decrements the first number of times when transferring the first frame.

Similarly, on receipt of the second frame, the communication device 120*d* determines whether or not the first field is 0. In this case the first field≠0 and so there is a possible number of times remaining to transfer frames, and so the communication device 120*d* recognizes itself as not being the second communication device. In this case the communication device 120*d* decrements the first field value from 1 to 0, and transfers the second frame through the first port 121*d* to the communication device 120*c*. Namely, the communication device 120*d* decrements the second number of times when transferring the second frame.

Next, on receipt of the first frame, the communication device 120*b* determines whether or not the first field is 0. In this case the first field=0 and so there are no possible times remaining to transfer frames, and so the communication device 120*b* recognizes itself as being the first communication device. In this case the communication device 120*b* does not transfer the first frame. Namely, the communication device 120*b* recognizes itself as being the first communication device and does not transfer the first frame when the number of transfer times of the first frame has reached a limit.

Similarly, on receipt of the second frame, the communication device 120*c* determines whether or not the first field is 0. In this case the first field=0 and so there are no possible times remaining to transfer frames, and so the communication device 120*c* recognizes itself as being the second communication device. In this case the communication device 120*c* does not transfer the second frame. Namely, the communication device 120*c* recognizes itself as being the second communication device and does not transfer the second frame when the number of transfer times of the second frame has reached a limit.

In this manner, the communication system 100 according to the second exemplary embodiment limits frame transfer using the possible number of times remaining to transfer frames. The communication system 100 according to the second exemplary embodiment is thereby able to use a smaller amount of information as the first information and the second information compared to cases in which identifiers allocated to the communication devices 120 are employed.

Note that in the second exemplary embodiment an example has been illustrated of a case in which the frame transfer is limited by the possible number of times remaining to transfer frames. However, frame transfer may be limited by a maximum possible number of times to transfer frames. Detailed description follows thereof.

Figure 8:
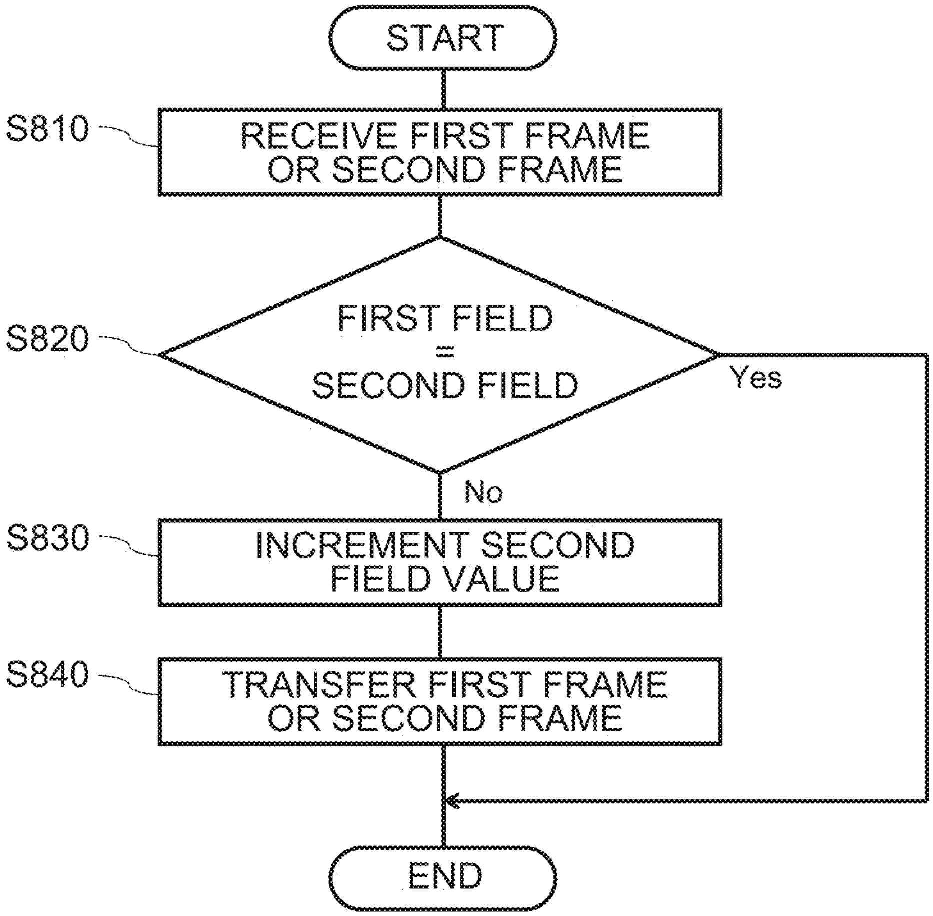
FIG. 8 is a diagram illustrating an example of frame processing executed by a communication device 120 according to a third exemplary embodiment.

FIG. 8 is a diagram illustrating an example of frame processing executed by the communication device 120 according to a third exemplary embodiment. At step S810, the communication device 120 receives the first frame or the second frame. In the first frame of the third exemplary embodiment, a first number of times indicating a maximum possible number of times to transfer the first frame is inserted into the first field, and a number of transfer times that the first frame has been transferred in the daisy chain connection is inserted in the second field. In the second frame, a second number of times indicating a maximum possible number of times to transfer the second frame is inserted into the first field, and a number of transfer times that the second frame has been transferred in the daisy chain connection is inserted in the second field. Description follows regarding an example of a case in which the first number of times and the second number of times are both 1 time.

At step S820, the communication device 120 determines whether or not the first field matches the second field. Namely, the communication device 120 determines whether or not the number of transfer times of frames has reached the maximum number of times. In cases in which the first field does not match the second field, processing proceeds to step S830 and the communication device 120 increments the value of the second field, and at step S840 transfers the first frame or the second frame. However, in a case in which the first field matches the second field, the communication device 120 does not execute the processing of steps S830 to S840. Namely, the communication device 120 does not transfer the first frame or the second frame. Detailed description follows regarding frame transfer according to the third exemplary embodiment, with reference to the drawings.

Figure 9:
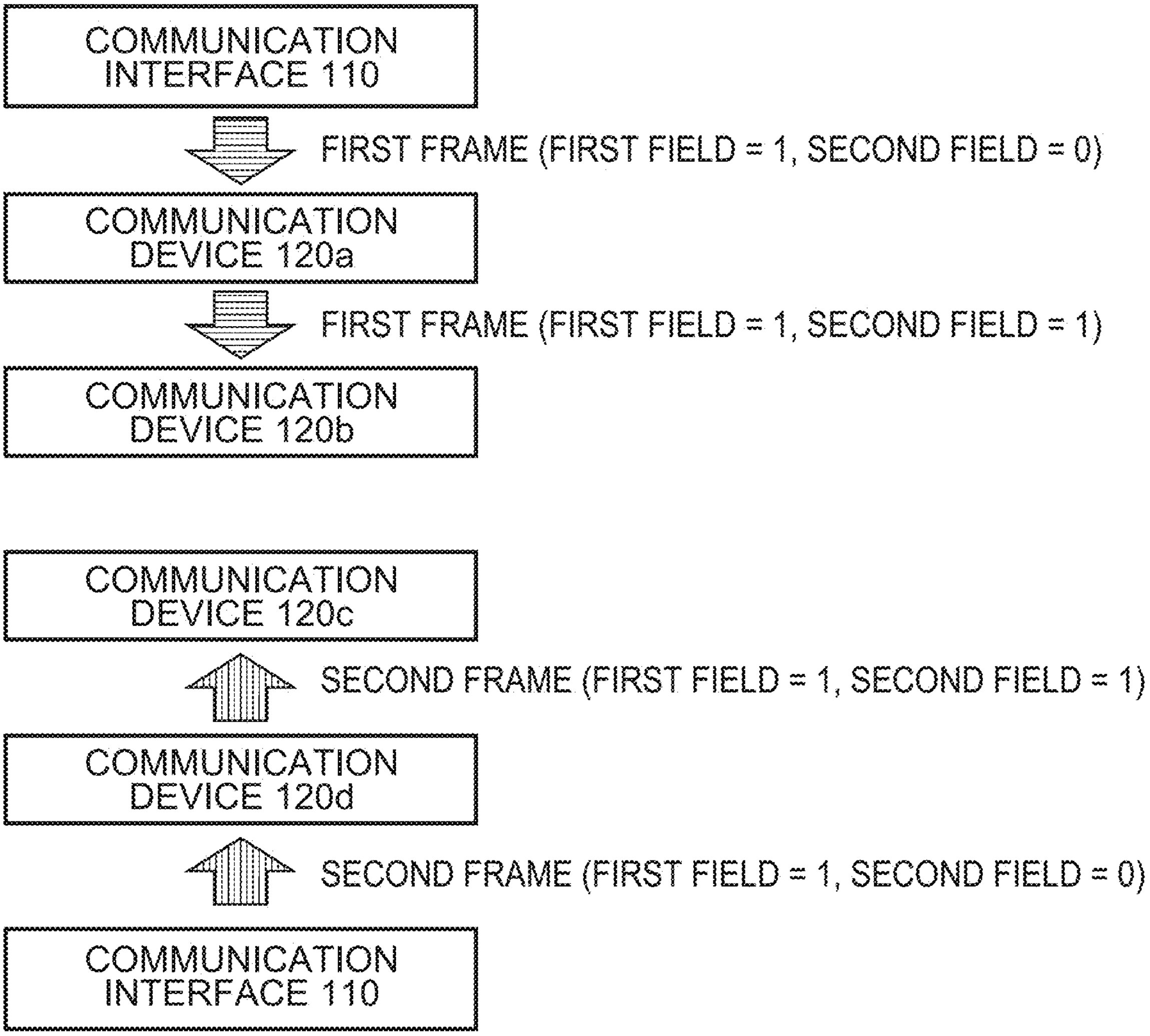
FIG. 9 is a diagram illustrating an example of frame transfer according to the third exemplary embodiment.

FIG. 9 is a diagram illustrating an example of frame transfer according to the third exemplary embodiment. On receipt of the first frame set with first field=1 and second field=0, and of the second frame set with the first field=1 and the second field=0, the communication interface 110 transmits the first frame to the first port 121*a* of the communication device 120*a*, and transmits the second the second frame to the second port 122*d* of the communication device 120*d*.

In response thereto, the communication device 120*a* receives the first frame and determines whether or not the first field matches the second field. In this case the first field ≠second field, and because the number of transfer times of frames has not reached the maximum number of times, the communication device 120*a* recognizes itself as not being the first communication device. In this case the communication device 120*a* increments the second field value from 0 to 1, and transfers the first frame through the second port 122*a* to the communication device 120*b*.

Similarly, on receipt of the second frame, the communication device 120*d* determines whether or not the first field matches the second field. In this case the first field ≠second field, and because the number of transfer times of frames has not reached the maximum number of times, the communication device 120*d* recognizes itself as not being the second communication device. In this case the communication device 120*d* increments the second field value from 0 to 1, and transfers the second frame through the first port 121*d* to the communication device 120*c*.

Next, on receipt of the first frame, the communication device 120*b* determines whether or not the first field matches the second field. In this case the first field=the second field and since the number of transfer times of frames has reached the maximum number of times, the communication device 120*b* recognizes itself as being the first communication device. In this case the communication device 120*b* does not transfer the first frame.

Similarly, on receipt of the second frame, the communication device 120*c* determines whether or not the first field matches the second field. In this case the first field=the second field and since the number of transfer times of frames has reached the maximum number of times, the communication device 120*c* recognizes itself as being the second communication device. In this case the communication device 120*c* does not transfer the second frame.

Thus in the communication system 100 according to the third exemplary embodiment, frame transfer is limited by a maximum possible number of times to transfer frames. The communication system 100 according to the third exemplary embodiment is thereby able to use a smaller amount of information as the first information and the second information compared to cases in which identifiers allocated to the communication devices 120 are employed. Moreover, the communication system 100 according to the third exemplary embodiment does not need to overwrite values in the first field in contrast to cases in which the possible number of times remaining to transfer frames is employed, enabling the value of the first field to remain as the information initially inserted.

The present disclosure includes the following content.

Supplement 1

A communication system including:

a communication device group that is configured by plurality of communication devices each including a first port and a second port, and that is connected together in a daisy chain such that the first port and the second port are connected between adjacent communication devices; and a communication interface that connects the communication device group to a network, wherein:

on receipt, over the network, of a first frame inserted with first information enabling recognition of a first communication device that limits frame transfer and of a second frame inserted with second information enabling recognition of a second communication device that limits frame transfer, the communication interface transmits the first frame to a first port of a communication device configuring a one-end of the daisy chain connection and transmits the second frame to a second port of a communication device configuring an other-end of the daisy chain connection;

on receipt of the first frame, each of the plurality of communication devices transfers the first frame through the second port in a case in which it has recognized itself as not being the first communication device based on the first information, and does not transfer the first frame in a case in which it has recognized itself as being the first communication device; and on receipt of the second frame, each of the plurality of communication devices transfers the second frame through the first port in a case in which it has recognized itself as not being the second communication device based on the second information, and does not transfer the second frame in a case in which it has recognized itself as being the second communication device.

Supplement 2

The communication system of Supplement 1, wherein:

the first information indicates a first identifier allocated to the first communication device;

the second information indicates a second identifier allocated to the second communication device; and each of the plurality of communication devices recognizes itself as being the first communication device when the first identifier matches its own identifier, and recognizes itself as being the second communication device when the second identifier matches its own identifier.

Supplement 3

The communication system of Supplement 1 or Supplement 2, wherein:

the first information indicates a first number of times for limiting a number of transfer times that the first frame is transferred;

the second information indicates a second number of times for limiting a number of transfer times that the second frame is transferred; and each of the plurality of communication devices recognizes itself as being the first communication device in a case in which the number of transfer times of the first frame has reached a limit, and recognizes itself as being the second communication device in a case in which the number of transfer times of the second frame has reached a limit.

Supplement 4

The communication system of Supplement 3, wherein:

the first number of times indicates a possible number of times remaining to transfer the first frame;

the second number of times indicates a possible number of times remaining to transfer the second frame; and each of the plurality of communication devices decrements the first number of times when transferring the first frame, and decrements the second number of times when transferring the second frame.

Supplement 5

The communication system of any one of Supplement 1 to Supplement 4, wherein:

each of the plurality of communication devices further includes a battery cell and a monitoring section that monitors a state of the battery cell, transmits monitoring data indicating a state of the battery cell through the first port on receipt of the first frame, and transmits the monitoring data through the second port on receipt of the second frame; and the communication interface provides the monitoring data over the network to a transmission originator of the first frame and the second frame on receipt of the monitoring data.

Supplement 6

A communication device that is a communication device configuring a communication device group configured by plurality of communication devices each including a first port and a second port, and connected together in a daisy chain such that the first port and the second port are connected between adjacent communication devices, wherein:

on receipt of a first frame inserted with first information enabling recognition of a first communication device that limits frame transfer, the communication device transfers the first frame through the second port in a case in which it has recognized itself as not being the first communication device based on the first information, and the communication device does not transfer the first frame in a case in which it has recognized itself as being the first communication device;

on receipt of a second frame inserted with second information enabling recognition of a second communication device that limits frame transfer, the communication device transfers the second frame through the first port in a case in which it has recognized itself as not being the second communication device based on the second information, and the communication device does not transfer the second frame in a case in which it has recognized itself as being the second communication device.

Supplement 7

The communication device of Supplement 6, wherein:

the first information indicates a first identifier allocated to the first communication device;

the second information indicates a second identifier allocated to the second communication device; and the communication device recognizes itself as being the first communication device when the first identifier matches its own identifier and recognizes itself as being the second communication device when the second identifier matches its own identifier.

Supplement 8

The communication device of Supplement 6 or Supplement 7, wherein:

the first information indicates a first number of times for limiting a number of transfer times that the first frame is transferred;

the second information indicates a second number of times for limiting a number of transfer times that the second frame is transferred; and the communication device recognizes itself as being the first communication device when the number of transfer times of the first frame has reached a limit, and recognizes itself as being the second communication device when the number of transfer times of the second frame has reached a limit.

Supplement 9

The communication device of Supplement 8, wherein:

the first number of times indicates a possible number of times remaining to transfer the first frame;

the second number of times indicates a possible number of times remaining to transfer the second frame; and the communication device decrements the first number of times when transferring the first frame and decrements the second number of times when transferring the second frame.

Supplement 10

A communication device that is a communication device configuring a communication device group configured by plurality of communication devices each including a first port and a second port, and connected together in a daisy chain such that the first port and the second port are connected between adjacent communication devices, wherein:

based on a frame received through either the first port or the second port and including designation information indicating a designated communication device, the communication device does not transfer the frame in a case in which it has recognized itself as being the designated communication device.

Supplement 11

A communication interface that is a communication interface connecting a network to a communication device group configured by plurality of communication devices each including a first port and a second port, and connected together in a daisy chain such that the first port and the second port are connected between adjacent communication devices, wherein:

on receipt, over the network, of a first frame inserted with first information enabling recognition of a first communication device that limits frame transfer and of a second frame inserted with second information enabling recognition of a second communication device that limits frame transfer, the communication interface transmits the first frame to a first port of a communication device configuring a one-end of the daisy chain connection and transmits the second frame to a second port of a communication device configuring an other-end of the daisy chain connection.

What is claimed is:

1. A communication system comprising:

a communication device group that is configured by a plurality of communication devices each including a first port and a second port, and that is connected together in a daisy chain such that the first port and the second port are connected between adjacent communication devices; and a communication interface that connects the communication device group to a network, wherein:

on receipt, over the network, of a first frame inserted with first information enabling recognition of a first communication device that limits frame transfer and of a second frame inserted with second information enabling recognition of a second communication device that limits frame transfer, the communication interface transmits the first frame to a first port of a communication device configuring a one-end of the daisy chain connection and transmits the second frame to a second port of a communication device configuring an other-end of the daisy chain connection;

on receipt of the first frame, each of the plurality of communication devices transfers the first frame through the second port in a case in which it has recognized itself as not being the first communication device based on the first information, and does not transfer the first frame in a case in which it has recognized itself as being the first communication device;

on receipt of the second frame, each of the plurality of communication devices transfers the second frame through the first port in a case in which it has recognized itself as not being the second communication device based on the second information, and does not transfer the second frame in a case in which it has recognized itself as being the second communication device; and the communication interface is further configured to determine a destination of the first frame such that a number of transfers from the one-end of the daisy chain connection to the first communication device is smaller than a number of transfers from the other-end of the daisy chain connection to the first communication device, determine a destination of the second frame such that a number of transfers from the other-end of the daisy chain connection to the second communication device is smaller than a number of transfers from the one-end of the daisy chain connection to the second communication device, and transmit the first frame to the first port of the communication device at the one-end of the daisy chain connection and transmit the second frame to the second port of the communication device at the other-end of the daisy chain connection at the same time.

2. The communication system of claim 1, wherein:

the first information indicates a first identifier allocated to the first communication device;

the second information indicates a second identifier allocated to the second communication device; and each of the plurality of communication devices recognizes itself as being the first communication device when the first identifier matches its own identifier, and recognizes itself as being the second communication device when the second identifier matches its own identifier.

3. The communication system of claim 1, wherein:

the first information indicates a first number of times for limiting a number of transfer times that the first frame is transferred;

the second information indicates a second number of times for limiting a number of transfer times that the second frame is transferred; and each of the plurality of communication devices recognizes itself as being the first communication device in a case in which the number of transfer times of the first frame has reached a limit, and recognizes itself as being the second communication device in a case in which the number of transfer times of the second frame has reached a limit.

4. The communication system of claim 3, wherein:

the first number of times indicates a remaining number of times that the first frame is transferrable;

the second number of times indicates a remaining number of times that the second frame is transferrable;

each of the plurality of communication devices determines whether the first number and the second number are zero;

when the first number is not zero, said each communication device decrements the first number and transfers the first frame;

when the second number is not zero, said each communication device decrements the second number and transfers the second frame;

when the first number is zero, said each communication device recognizes itself as the first communication device and does not transfer the first frame; and when the second number is zero, said each communication device recognizes itself as the second communication device and does not transfer the second frame.

5. The communication system of claim 1, wherein:

each of the plurality of communication devices:

further includes a battery cell and a monitoring section that monitors a state of the battery cell, transmits monitoring data indicating a state of the battery cell through the first port on receipt of the first frame, and transmits the monitoring data through the second port on receipt of the second frame; and the communication interface provides the monitoring data over the network to a transmission originator of the first frame and the second frame on receipt of the monitoring data.

6. A communication device that is a communication device configuring a communication device group configured by a plurality of communication devices each including a first port and a second port, and connected together in a daisy chain such that the first port and the second port are connected between adjacent communication devices, wherein:

in an environment in which a first frame having a destination determined such that a number of transfers from one end of the daisy chain connection to a first communication device is smaller than a number of transfers from the other end of the daisy chain to the first communication device, and a second frame having a destination determined such that a number of transfers from the other end of the daisy chain to a second communication device is smaller than a number of transfers from the one end of the daisy chain to the second communication device, are input to the communication device group at the same time, the communication device is configured to receive either the first frame or the second frame;

on receipt of the first frame inserted with first information enabling recognition of the first communication device that limits frame transfer, the communication device transfers the first frame through the second port in a case in which it has recognized itself as not being the first communication device based on the first information, and the communication device does not transfer the first frame in a case in which it has recognized itself as being the first communication device; and on receipt of the second frame inserted with second information enabling recognition of the second communication device that limits frame transfer, the communication device transfers the second frame through the first port in a case in which it has recognized itself as not being the second communication device based on the second information, and the communication device does not transfer the second frame in a case in which it has recognized itself as being the second communication device.

7. The communication device of claim 6, wherein:

the first information indicates a first identifier allocated to the first communication device;

the second information indicates a second identifier allocated to the second communication device; and the communication device recognizes itself as being the first communication device when the first identifier matches its own identifier and recognizes itself as being the second communication device when the second identifier matches its own identifier.

8. The communication device of claim 6, wherein:

the first information indicates a first number of times for limiting a number of transfer times that the first frame is transferred;

the second information indicates a second number of times for limiting a number of transfer times that the second frame is transferred; and the communication device recognizes itself as being the first communication device when the number of transfer times of the first frame has reached a limit, and recognizes itself as being the second communication device when the number of transfer times of the second frame has reached a limit.

9. The communication device of claim 8, wherein:

the first number of times indicates a remaining number of times that the first frame is transferrable;

the second number of times indicates a possible remaining number of times that the second frame is transferrable;

the communication device determines whether the first number and the second number are zero;

when the first number is not zero, the communication device decrements the first number and transfers the first frame;

when the second number is not zero, the communication device decrements the second number and transfers the second frame;

when the first number is zero, the communication device recognizes itself as the first communication device and does not transfer the first frame; and when the second number is zero, the communication device recognizes itself as the second communication device and does not transfer the second frame.

10. A communication interface that is a communication interface connecting a network to a communication device group configured by a plurality of communication devices each including a first port and a second port, and connected together in a daisy chain such that the first port and the second port are connected between adjacent communication devices, wherein:

on receipt, over the network, of a first frame inserted with first information enabling recognition of a first communication device that limits frame transfer and of a second frame inserted with second information enabling recognition of a second communication device that limits frame transfer, the communication interface transmits the first frame to a first port of a communication device configuring a one-end of the daisy chain connection and transmits the second frame to a second port of a communication device configuring an other-end of the daisy chain connection; and the communication interface is further configured to determine a destination of the first frame such that a number of transfers from the one-end of the daisy chain connection to the first communication device is smaller than a number of transfers from the other-end of the daisy chain connection to the first communication device, determine a destination of the second frame such that a number of transfers from the other-end of the daisy chain connection to the second communication device is smaller than a number of transfers from the one-end of the daisy chain connection to the second communication device, and transmit the first frame to the first port of one of the plurality of communication devices at the one-end of the daisy chain connection, and transmit the second frame to the second port of another one of the plurality of communication devices at the other-end of the daisy chain connection at the same time.

11. The communication system of claim 3, wherein each of the first frame and the second frame further includes:

a first field into which the first information or the second information is inserted; and a second field into which the number of transfers in the daisy-chain connection is inserted;

the first number indicates the maximum number of transfers of the first frame;

the second number indicates the maximum number of transfers of the second frame;

each communication device determines whether the value of the first field matches the value of the second field;

when the values do not match, the communication device increments the value of the second field and transfers the first or second frame; and when the values match, the communication device recognizes itself as the first communication device or the second communication device and does not transfer the first or second frame.

* * * * *